(12) United States Patent
Kobayashi et al.

(10) Patent No.: US 10,000,120 B2
(45) Date of Patent: Jun. 19, 2018

(54) WORK VEHICLE

(71) Applicant: KUBOTA CORPORATION, Osaka (JP)

(72) Inventors: Daisuke Kobayashi, Osaka (JP); Akari Kakudate, Osaka (JP); Daisuke Fujii, Osaka (JP); Takuya Inamori, Osaka (JP); Muneomi Kikuchi, Osaka (JP); Ryuusuke Furukawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 558 days.

(21) Appl. No.: 14/641,757

(22) Filed: Mar. 9, 2015

(65) Prior Publication Data

US 2015/0344084 A1 Dec. 3, 2015

(30) Foreign Application Priority Data

May 28, 2014 (JP) .................................. 2014-110253

(51) Int. Cl.
*B60K 25/00* (2006.01)
*G05G 1/04* (2006.01)
*G05G 1/30* (2008.04)
*B62D 33/073* (2006.01)

(52) U.S. Cl.
CPC ............ *B60K 25/00* (2013.01); *B62D 33/073* (2013.01); *G05G 1/04* (2013.01); *G05G 1/30* (2013.01); *Y10T 74/20396* (2015.01)

(58) Field of Classification Search
CPC ........ B60K 25/00; B62D 33/073; G05G 1/04; G05G 1/30; Y10T 74/20396
See application file for complete search history.

(56) References Cited

U.S. PATENT DOCUMENTS

| | | | | |
|---|---|---|---|---|
| 4,450,927 A | * | 5/1984 | Hirata .................... | B60K 20/02 180/330 |
| 4,631,980 A | * | 12/1986 | Ishimori .............. | B60K 17/105 74/718 |
| 5,237,883 A | * | 8/1993 | Churchill .............. | B60K 25/00 180/271 |
| 5,992,260 A | * | 11/1999 | Fujiki ................ | A01B 63/1006 200/61.88 |
| 6,129,187 A | * | 10/2000 | Bellanger .............. | B60K 17/28 192/3.58 |

(Continued)

FOREIGN PATENT DOCUMENTS

| | | |
|---|---|---|
| EP | 1288063 | 3/2003 |
| EP | 2700754 | 2/2014 |
| JP | 4447516 | 1/2007 |

OTHER PUBLICATIONS

European Search Report issued in European Patent Application No. 15164783.1, dated Oct. 5, 2015.

*Primary Examiner* — Darlene P Condra
(74) *Attorney, Agent, or Firm* — Greenblum & Bernstein, P.L.C.

(57) ABSTRACT

The present invention is a work vehicle having a first operation tool which is rockable or movable in a front/back direction arranged on a one side of a driver's seat. A second operation tool is rockable or movable in the front/back direction and is arranged forward of the first operation tool. A third operation tool is depressible and is arranged between the first operation tool and the second operation tool in the front/back direction.

20 Claims, 9 Drawing Sheets

(56) References Cited

U.S. PATENT DOCUMENTS

| | | |
|---|---|---|
| 7,438,517 B2 | 10/2008 | Tanaka et al. |
| 8,434,562 B2 | 5/2013 | Miyasaka et al. |
| 2003/0042063 A1* | 3/2003 | Arthur ................ B60N 2/4693 180/315 |
| 2003/0051969 A1* | 3/2003 | Reinards ................ B60K 17/28 192/103 F |
| 2007/0020068 A1* | 1/2007 | Tanaka ............... A01B 63/1013 414/349 |
| 2010/0212450 A1 | 8/2010 | Miyasaka et al. |
| 2010/0242637 A1* | 9/2010 | Inamori ................ B60K 25/00 74/15.86 |
| 2012/0073895 A1* | 3/2012 | Nishi ...................... B60N 2/24 180/336 |
| 2013/0225364 A1* | 8/2013 | Kuroshita ............ E02F 9/2066 477/52 |
| 2014/0056676 A1* | 2/2014 | Wakino ............. B62D 33/0617 414/694 |
| 2015/0257336 A1* | 9/2015 | Dwyer .................. H01H 13/52 701/50 |

* cited by examiner

WORK VEHICLE

CROSS-REFERENCE TO RELATED APPLICATIONS

The present application claims priority under 35 U.S.C. § 119 of Japanese Application No. 2014-110253, filed on May 28, 2014, the disclosure of which is expressly incorporated by reference herein in its entirety.

BACKGROUND OF THE INVENTION

1. Field of the Invention

The present invention is related to technology of a work vehicle.

2. Description of Related Art

Conventionally, technology of a work vehicle provided with a plurality of operation tools is known. For example, Japanese Patent No. 4447516 discloses such a technology. Japanese Patent No. 4447516 describes a tractor (work vehicle) having a speed change operation part arranged on a right side of a driver's seat. A plurality of operation tools are arranged in the speed change operation part. Specifically, operation tools such as a main speed change lever, an auxiliary speed change lever, a PTO lever, a position lever, and a loader lever are arranged in appropriate positions in the speed change operation part.

As described above, normally, a plurality of (many) operation tools are arranged in a work vehicle. Therefore, the arrangement of the plurality of operation tools is determined by taking into account operability (such as inhibiting operational errors and ease of operation) for an operator.

However, conventional arrangements of operation tools are still wanting of improvement from a perspective of operability.

SUMMARY OF THE INVENTION

In view of the above circumstance, the present invention provides a work vehicle in which the operability of a plurality of operation tools can be enhanced.

That is, the present invention is provided with a first operation tool which is rockable in a front/back direction arranged on either a left or a right side of a driver's seat, a second operation tool which is rockable in the front/back direction arranged forward of the first operation tool, a third operation tool which is depressible arranged between the first operation tool and the second operation tool in the front/back direction.

An advantage of the present invention is to arrange a depressible operation tool (the third operation tool) between rockable operation tools (the first operation tool and the second operation tool) so that operation tools having different operation methods are arranged alternately, thereby enhancing operability (prevention of operational errors).

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the description below, directions indicated by an arrow U, an arrow D, an arrow F, an arrow B, an arrow L, and an arrow R in the drawings shall be defined as an upward direction, a downward direction, a forward direction, a back direction, a left direction, and a right direction, respectively.

Figure 1:
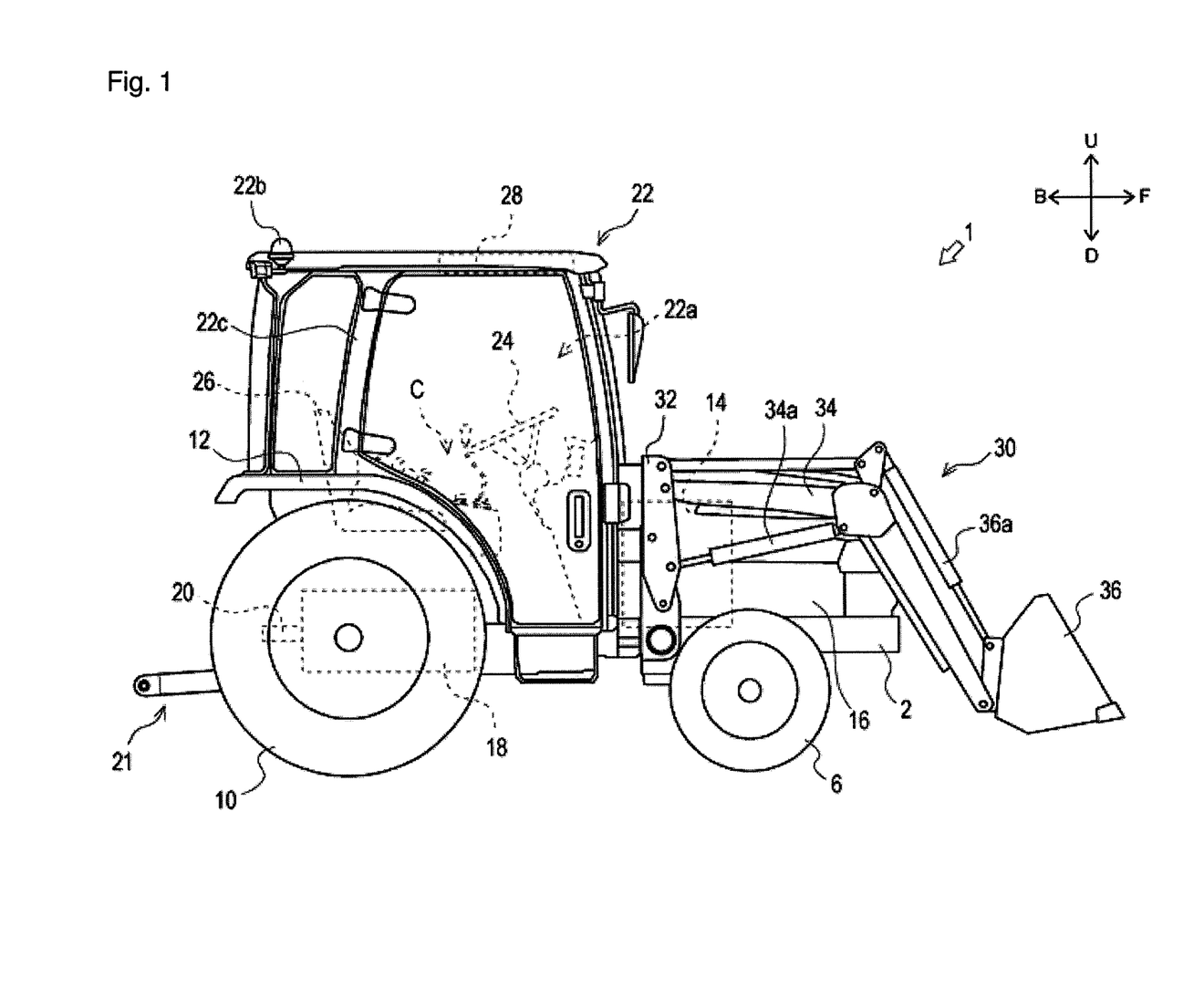
FIG. 1 is a side view of an overall configuration of a tractor according to an embodiment of the present invention.

First, an overall configuration of a tractor 1 according to one embodiment of the present invention is described using FIG. 1.

The tractor 1 is primarily provided with a body frame 2, front wheels 6, rear wheels 10, fenders 12, an engine 14, a hood 16, a speed change apparatus 18, a power take-off (PTO) shaft 20, a hydraulic lifting apparatus 21, a cabin 22, a steering wheel 24, a driver's seat 26, an operation part C, an air conditioner 28, and a front loader 30.

The body frame 2 is arranged so that its longitudinal direction is oriented in a front/back direction. A front portion of the body frame 2 is supported by a left/right pair of front wheels 6 via a front axle mechanism (not shown in the drawings). The speed change apparatus 18 housed in a transmission case is provided in a rear portion of the body frame 2. A rear portion of the speed change apparatus 18 is supported by a left/right pair of rear wheels 10 via a rear axle mechanism (see FIG. 8). The fenders 12 are provided above the rear wheels 10. The fenders 12 are formed along an upper portion of the rear wheels 10 and are arranged so as to cover the rear wheels 10 from above.

The engine 14 is provided in the front portion of the body frame 2. The engine 14 is covered by the hood 16. A speed of a power of the engine 14 is changed by the speed change apparatus 18 and is then capable of being transmitted to the front wheels 6 via the front axle mechanism as well as being transmitted to the rear wheels 10 via the rear axle mechanism 8. The front wheels 6 and the rear wheels 10 are rotationally driven by the power of the engine 14, and this enables the tractor 1 to travel.

In addition, the speed of the power of the engine 14 is changed by the speed change apparatus 18 and is then capable of being transmitted to the PTO shaft 20. The power can be transferred to an exterior from the PTO shaft 20. A work apparatus (for example, a tilling apparatus or the like) can be driven by coupling the work apparatus to the PTO shaft 20. The hydraulic lifting apparatus 21 to which the work apparatus (the tilling apparatus and the like) is mounted is provided in a rear portion of the tractor 1.

The cabin 22 is provided rearward of the engine 14. A living space 22a which an operator gets into is formed in an interior of the cabin 22. The steering wheel 24 which adjusts a turning angle of the front wheels 6, the driver's seat 26 on which a driver sits and the like are arranged in the living space 22a. The operation part C in which various operation tools are arranged is provided on a right side of the driver's seat 26. The air conditioner 28 is arranged in an interior of a roof of the cabin 22. Air within the living space 22a is treated by the air conditioner 28. A rotating light 22b which switches on when the tractor 1 is working or traveling is attached to a rear portion of the roof of the cabin 22.

The front loader 30 is mounted on a front portion of the tractor 1. The front loader 30 is primarily provided with a support frame 32, a boom 34, and a bucket 36. The support frame 32 is fixed to a middle portion (in the front/back direction) of the body frame 2. The boom 34 is pivotably coupled to an upper portion of the support frame 32 and is arranged so as to extend forward. The bucket 36 is pivotably coupled to a front end portion of the boom 34. The boom 34 can be pivoted with respect to the support frame 32 by extending/contracting a boom cylinder 34a. The bucket 36 can be pivoted with respect to the boom 34 by extending/contracting a bucket cylinder 36a. It is possible to perform transportation of soil/sand and the like by appropriately pivoting the boom 34 and the bucket 36 as described above.

Figure 2:
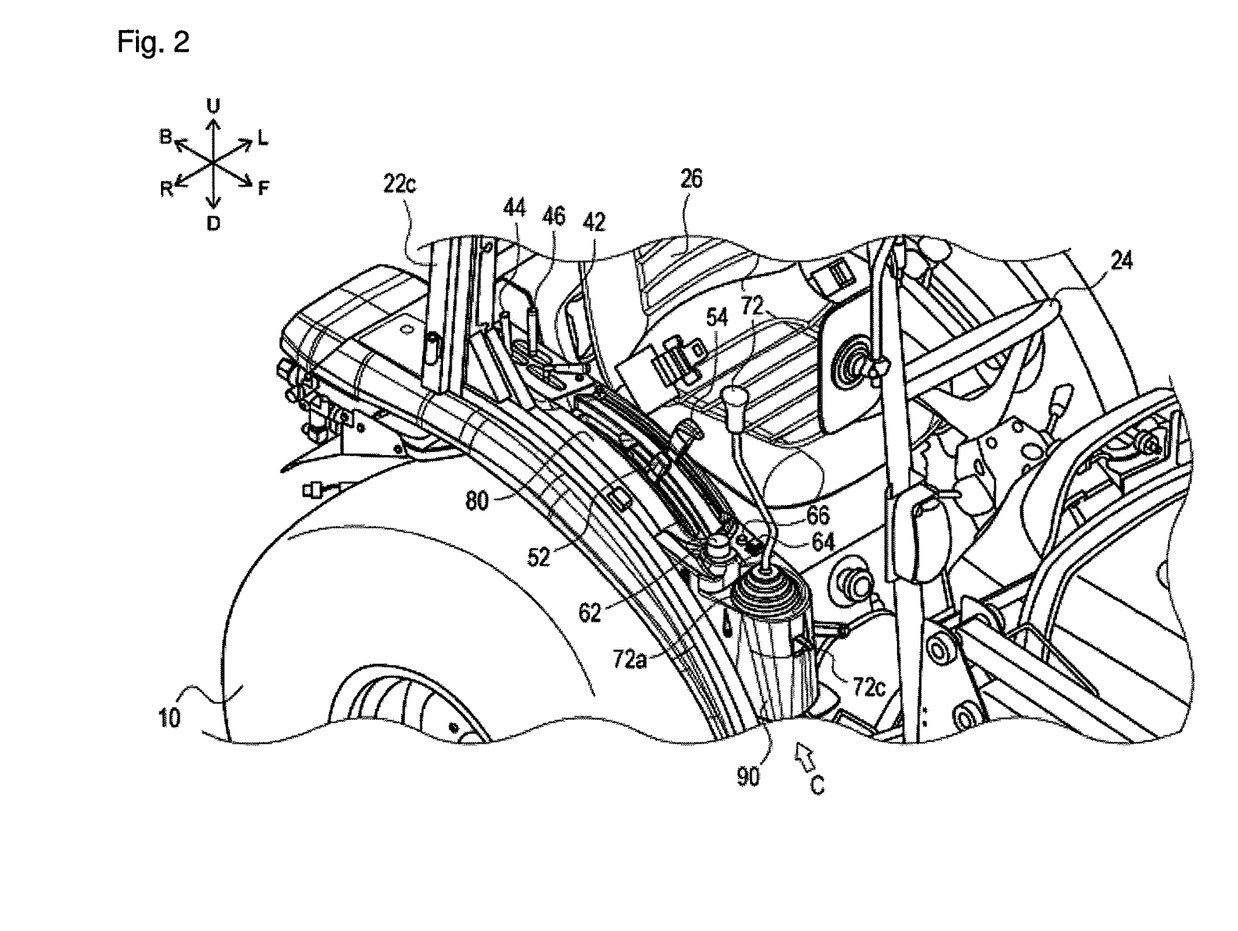
FIG. 2 is a right front perspective view of an operation part.
Figure 3:
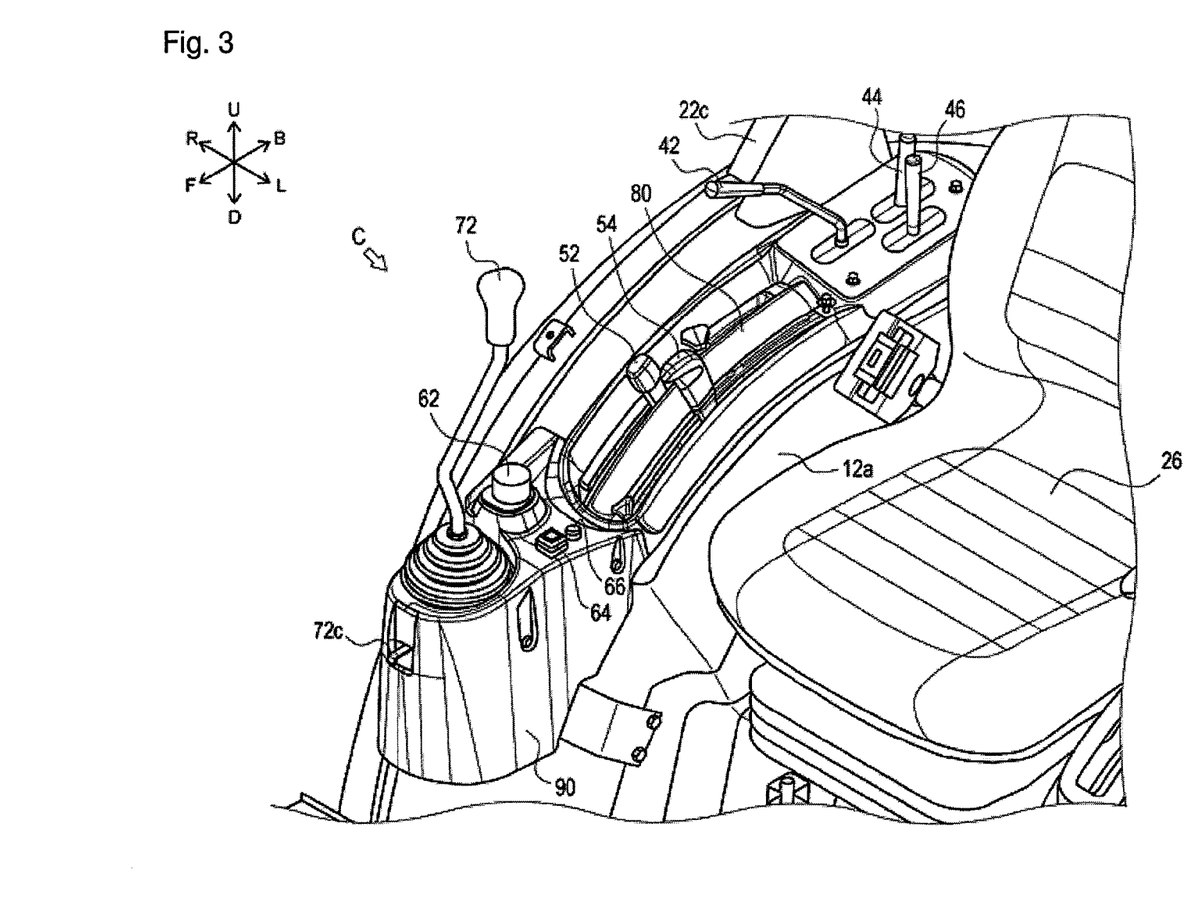
FIG. 3 is a left front perspective view of the operation part.
Figure 4:
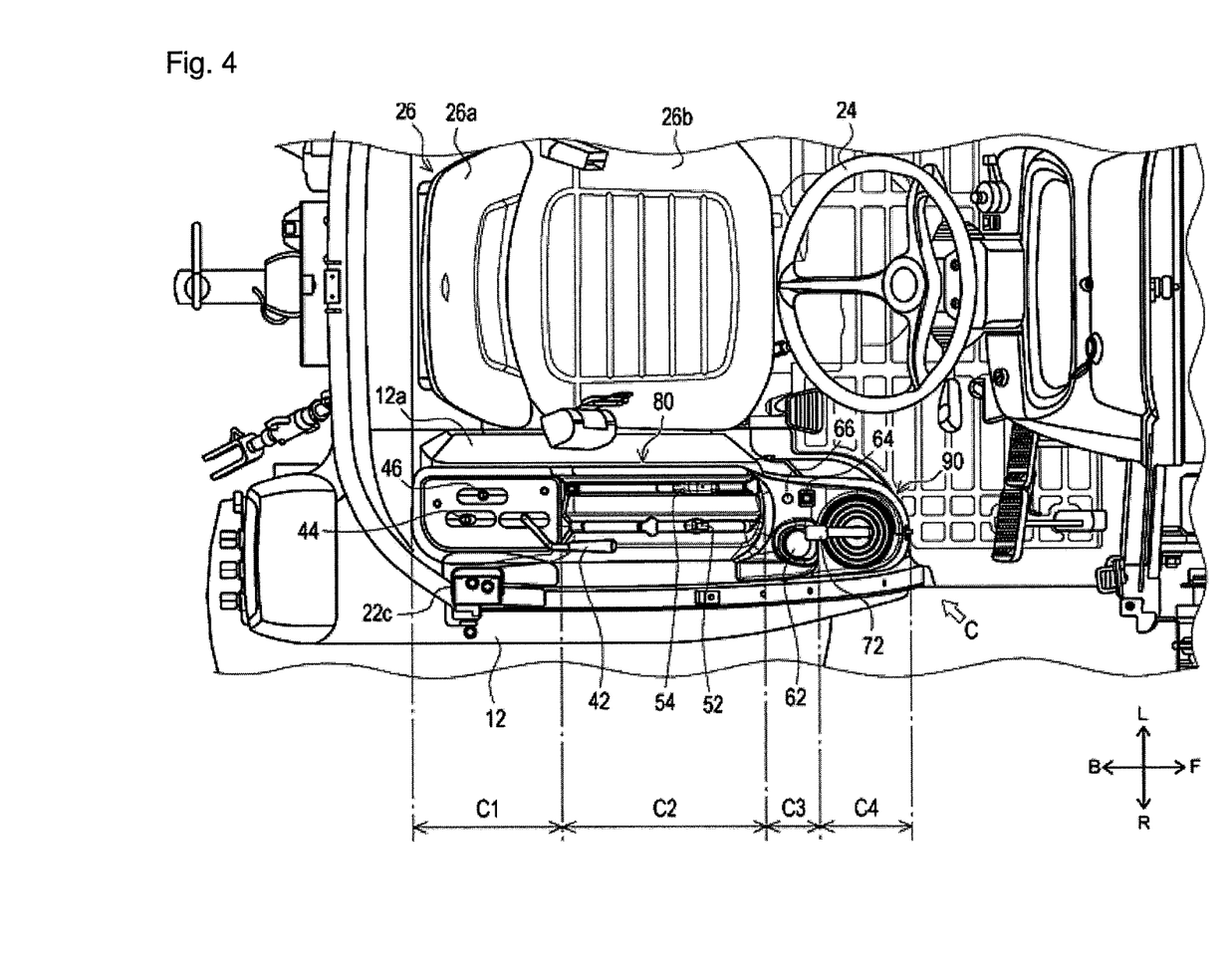
FIG. 4 is a plan or top view of the operation part.

Next, a summary of the operation part C provided in the living space 22a is provided using FIGS. 2 through 4.

The operation part C is a portion in which various operation tools are arranged which include, in particular, operation tools which operate the front loader 30 and the work apparatus mounted on the tractor 1, such as the tilling apparatus and the like. The operation part C is arranged on the right side of the driver's seat 26 in the living space 22a. The operation part C is arranged along an inner lateral surface 12a (a portion facing the living space 22a) of one of the fenders 12 (one of the fenders 12 on the right side). The operation part C can be broadly divided into a first arrangement part C1, a second arrangement part C2, a third arrangement part C3, and a fourth arrangement part C4 (see FIG. 4).

The first arrangement part C1 is a portion of the operation part C in which a first auxiliary control lever 42, a second auxiliary control lever 44, and a third auxiliary control lever 46 are arranged. The first arrangement part C1 is formed so as to be positioned between a rear support column 22c provided in a right rear portion of the cabin 22 and a backrest portion 26a of the driver's seat 26.

The first auxiliary control lever 42, the second auxiliary control lever 44, and the third auxiliary control lever 46 arranged in the first arrangement part C1 are operation tools which operate various work apparatuses that may be mounted to the tractor 1 including, in particular, hydraulically driven work apparatuses (not shown in the drawings).

The second arrangement part C2 is a portion of the operation part C in which a PTO speed change lever 52 and a hydraulic lifting lever 54 are arranged. The second arrangement part C2 is formed immediately forward of the first arrangement part C1 in a plan view. A front end portion of the second arrangement part C2 is formed so as to be in substantially the same position (in the front/back direction) as a front end portion of a seat surface portion 26b of the driver's seat 26.

The PTO speed change lever 52 arranged in the second arrangement part C2 is an operation tool which changes the speed of the power transmitted to the PTO shaft 20 by changing the speed change ratio of the speed change apparatus 18.

The hydraulic lifting lever 54 arranged in the second arrangement part C2 is an operation tool which lifts/lowers the work apparatus mounted to the hydraulic lifting apparatus 21 by lifting/lowering the hydraulic lifting apparatus 21.

The third arrangement part C3 is a portion of the operation part C in which a PTO clutch switch 62, a rotating light switch 64, and a loader switch 66 are arranged. The third arrangement part C3 is formed immediately forward of the second arrangement part C2 in a plan view.

The PTO clutch switch 62 arranged in the third arrangement part C3 is an operation tool which operates (disengages/engages) a PTO clutch (not shown in the drawings) which enables/disables the transmission of power to the PTO shaft 20.

The rotating light switch 64 arranged in the third arrangement part C3 is an operation tool which switches the rotating light 22b on/off.

The loader switch 66 arranged in the third arrangement part C3 is an operation tool which enables/disables a loader operation regulation mechanism. The "loader operation regulation mechanism" is a mechanism in which operation of the front loader 30 (extension/contraction of the boom cylinder 34a and the bucket cylinder 36a) as described below is enabled only while a button (not shown in the drawings) provided on a loader lever 72 (described below) is being depressed. In a state where the loader operation regulation mechanism is disabled, the front loader 30 can be operated regardless of operation/non-operation of the button.

The fourth arrangement part C4 is a portion of the operation part C in which the loader lever 72 is arranged. The fourth arrangement part C4 is formed immediately forward of the third arrangement part C3 in a plan view. A front end portion of the fourth arrangement part C4 is formed so as to be in substantially the same position (in the front/back direction) as a front end portion of the fender 12.

The loader lever 72 arranged in the fourth arrangement part C4 is an operation tool which operates the front loader 30.

A first cover member 80 is arranged over the first arrangement part C1 and the second arrangement part C2 so as to cover the first arrangement part C1 and the second arrangement part C2. In addition, a second cover member 90 is arranged over the third arrangement part C3 and the fourth arrangement part C4 so as to cover the third arrangement part C3 and the fourth arrangement part C4.

Figure 5:
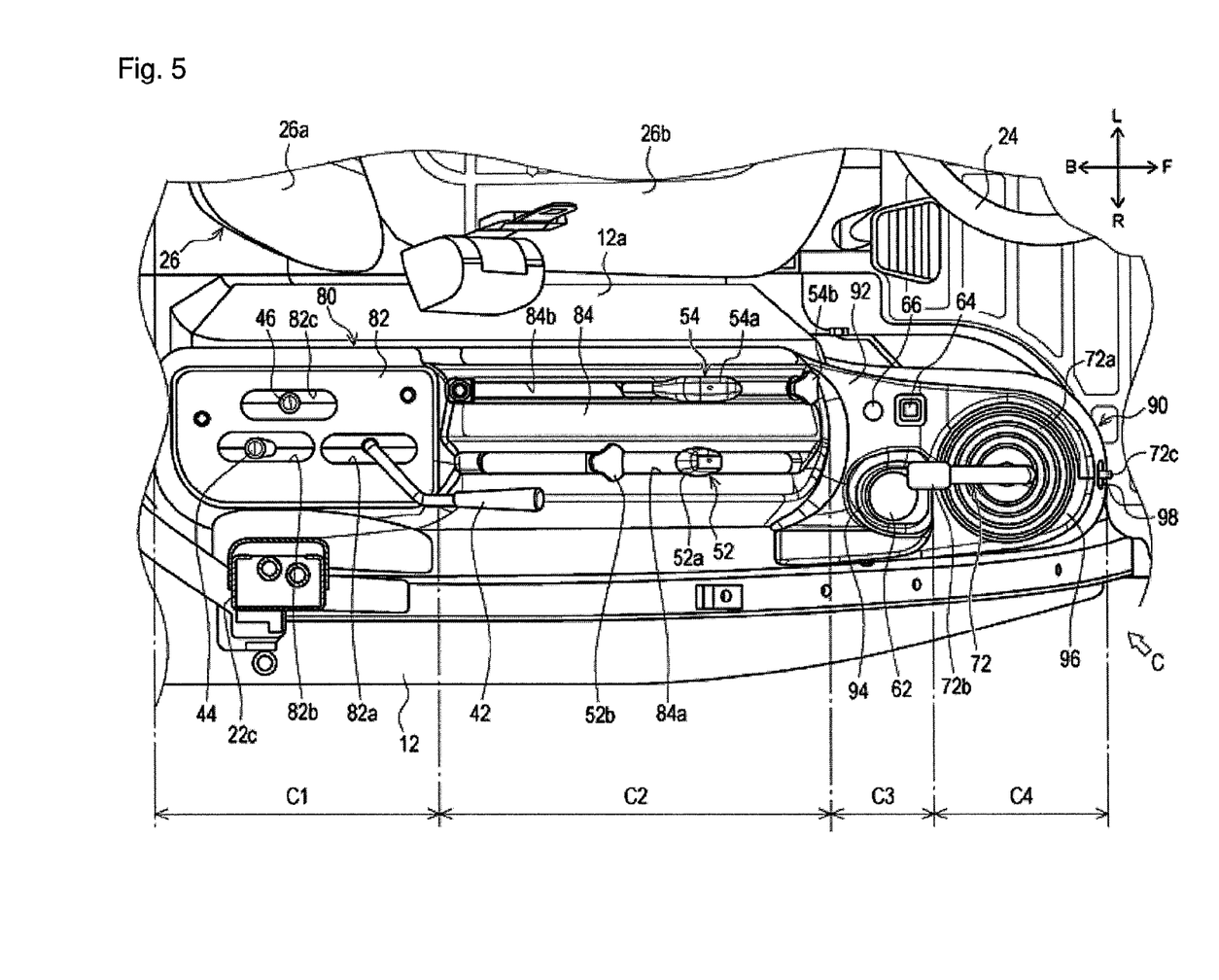
FIG. 5 is an expanded plan or enlarged top view of the operation part.

A detailed configuration of the operation part C is explained below using FIGS. 5 through 7.

A flat portion 82 and a curved surface portion 84 are primarily formed in the first cover member 80 arranged over the first arrangement part C1 and the second arrangement part C2.

The flat portion 82 of the first cover member 80 is a portion in which a substantially horizontal plane is formed on an upper portion thereof. The flat portion 82 is formed on a portion of the first cover member 80 which corresponds to the first arrangement part C1, that is, from a middle portion (in the front/back direction) of the first cover member 80 to a rear end portion thereof. A first guide groove 82a, a second guide groove 82b, and a third guide groove 82c are formed on the upper portion of the flat portion 82.

The first guide groove 82a is formed so as to penetrate the flat portion 82 in the front/back direction and is formed in a groove-like shape extending in the front/back direction. The first guide groove 82a is formed on a right front portion of the flat portion 82.

The second guide groove 82b is formed so as to penetrate the flat portion 82 in the front/back direction and is formed in a groove-like shape extending in the front/back direction. The second guide groove 82b is formed on a right rear portion of the flat portion 82 (rearward of the first guide groove 82a).

The third guide groove 82c is formed so as to penetrate the flat portion 82 in the front/back direction and is formed in a groove-like shape extending in the front/back direction. The third guide groove 82c is formed on a left portion of the flat portion 82 (left of the first guide groove 82a and the second guide groove 82b).

The first auxiliary control lever 42 is inserted into or extends through the first guide groove 82a. An upper portion of the first auxiliary control lever 42 is appropriately curved and is formed so as to extend forward. An upper end portion (front end portion) of the first auxiliary control lever 42 is formed so as to be positioned on a right side of an outer guide groove 84a (described below) of the second arrangement part C2 in a plan view.

The second auxiliary control lever 44 is inserted into or extends through the second guide groove 82b. An upper portion of the second auxiliary control lever 44 is formed so as to extend substantially vertically upward.

The third auxiliary control lever 46 is inserted into or extends through the third guide groove 82c. An upper portion of the third auxiliary control lever 46 is formed so as to extend substantially vertically upward.

The first auxiliary control lever 42, the second auxiliary control lever 44, and the third auxiliary control lever 46 are each supported around a support point provided on a lower portion thereof so as to be rockable in the front/back direction. This enables each of the first auxiliary control lever 42, the second auxiliary control lever 44, and the third auxiliary control lever 46 to be rockable along the guide groove into which it is inserted (the first guide groove 82a, the second guide groove 82b, and the third guide groove 82c)).

The curved surface portion 84 of the first cover member 80 is a portion formed so as to gradually curve from a rear upper portion of the first cover member 80 toward a front lower portion thereof along the shape of the fender 12. The curved surface portion 84 is formed on a portion of the first cover member 80 which corresponds to the second arrangement part C2, that is, from the middle portion (in the front/back direction) of the first cover member 80 to a front end portion thereof. A rear end portion of the curved surface portion 84 is formed so as to be continuous with a front end portion of the flat portion 82. The outer guide groove 84a and an inner guide groove 84b are formed on the curved surface portion 84.

The outer guide groove 84a is formed so as to penetrate the curved surface portion 84 in the front/back direction. The outer guide groove 84a is formed in a groove-like shape extending in the front/back direction and is formed near a right end portion of the curved surface portion 84. The outer guide groove 84a is formed from a rear end portion of the curved surface portion 84 (substantially the same position (in the front/back direction) as a rear end portion of the seat surface portion 26b) to a front end portion thereof (substantially the same position (in the front/back direction) as the front end portion of the seat surface portion 26b).

The inner guide groove 84b is formed so as to penetrate the curved surface portion 84 in the front/back direction. The inner guide groove 84b is formed in a groove-like shape extending in the front/back direction. The inner guide groove 84b is formed near a left end portion of the curved surface portion 84 (left of the outer guide groove 84a). The inner guide groove 84b is formed from the rear end portion of the curved surface portion 84 to the front end portion thereof. Thus, the inner guide groove 84b is formed so as to be adjacent and parallel to the outer guide groove 84a.

The PTO speed change lever 52 is inserted into the outer guide groove 84a. A grip portion 52a which the operator grips when operating the PTO speed change lever 52 is provided on an upper end portion of the PTO speed change lever 52. The PTO speed change lever 52 is supported around a support point provided on a lower portion thereof so as to be rockable in the front/back direction. This enables the PTO speed change lever 52 to be rockable along the outer guide groove 84a.

In addition, a regulating member 52b which regulates rocking of the PTO speed change lever 52 is provided in the outer guide groove 84a. The regulating member 52b is provided rearward of the PTO speed change lever 52 in the outer guide groove 84a. A position of the regulating member 52b within the outer guide groove 84a can be changed as desired. By changing the position of the regulating member 52b, rearward rocking of the PTO speed change lever 52 can be regulated at a desired position. This enables regulation of the operation to change the speed change ratio of the power transmitted to the PTO shaft 20.

The hydraulic lifting lever 54 is inserted into the inner guide groove 84b. A grip portion 54a which the operator grips when operating the hydraulic lifting lever 54 is provided on an upper end portion of the hydraulic lifting lever 54. The hydraulic lifting lever 54 is supported around a support point provided on a lower portion thereof so as to be rockable in the front/back direction. This enables the hydraulic lifting lever 54 to be rockable along the inner guide groove 84b.

In addition, a regulating member 54b which regulates rocking of the hydraulic lifting lever 54 is provided in the inner guide groove 84b. The regulating member 54b is provided forward of the hydraulic lifting lever 54 in the inner guide groove 84b. A position of the regulating member 54b within the inner guide groove 84b can be changed as desired. By changing the position of the regulating member 54b, forward rocking of the hydraulic lifting lever 54 can be regulated at a desired position. This prevents the work apparatus mounted to the hydraulic lifting apparatus 21 from falling to a position lower than a prescribed height.

A first flat portion 92, a projected portion 94, a second flat portion 96, and a through hole 98 are primarily formed in the second cover member 90 arranged over the third arrangement part C3 and the fourth arrangement part C4.

The first flat portion 92 is a portion in which a substantially horizontal plane is formed on an upper portion thereof. The first flat portion 92 is formed on a rear portion of the second cover member 90 (portion corresponding to the third arrangement part C3). A rectangular first opening 92a and a round second opening 92b are formed in a left portion of the first flat portion 92 (see FIG. 7).

The projected portion 94 is a portion formed by causing a portion of the first flat portion 92 to project upward. The projected portion 94 is formed in a substantially round columnar shape. A substantially horizontal plane is formed on an upper portion of the projected portion 94. The projected portion 94 is formed on a right portion of the first flat portion 92. An opening 94a is formed on an upper portion of the projected portion 94 (see FIG. 7).

The second flat portion 96 is a portion in which a substantially horizontal plane is formed on an upper portion thereof. The second flat portion 96 is formed forward of the first flat portion 92 on a front portion of the second cover member 90 (portion corresponding to the fourth arrangement part C4). The second flat portion 96 is formed at a position lower (position one level lower) than the first flat portion 92. An opening 96a is formed at substantially the center of the second flat portion 96 (see FIG. 7).

The through hole 98 is formed so as to penetrate a front lateral surface of the second cover member 90 in the front/back direction. The through hole 98 is formed so as to be positioned forward of the center of the opening 96a of the second flat portion 96.

Figure 7:
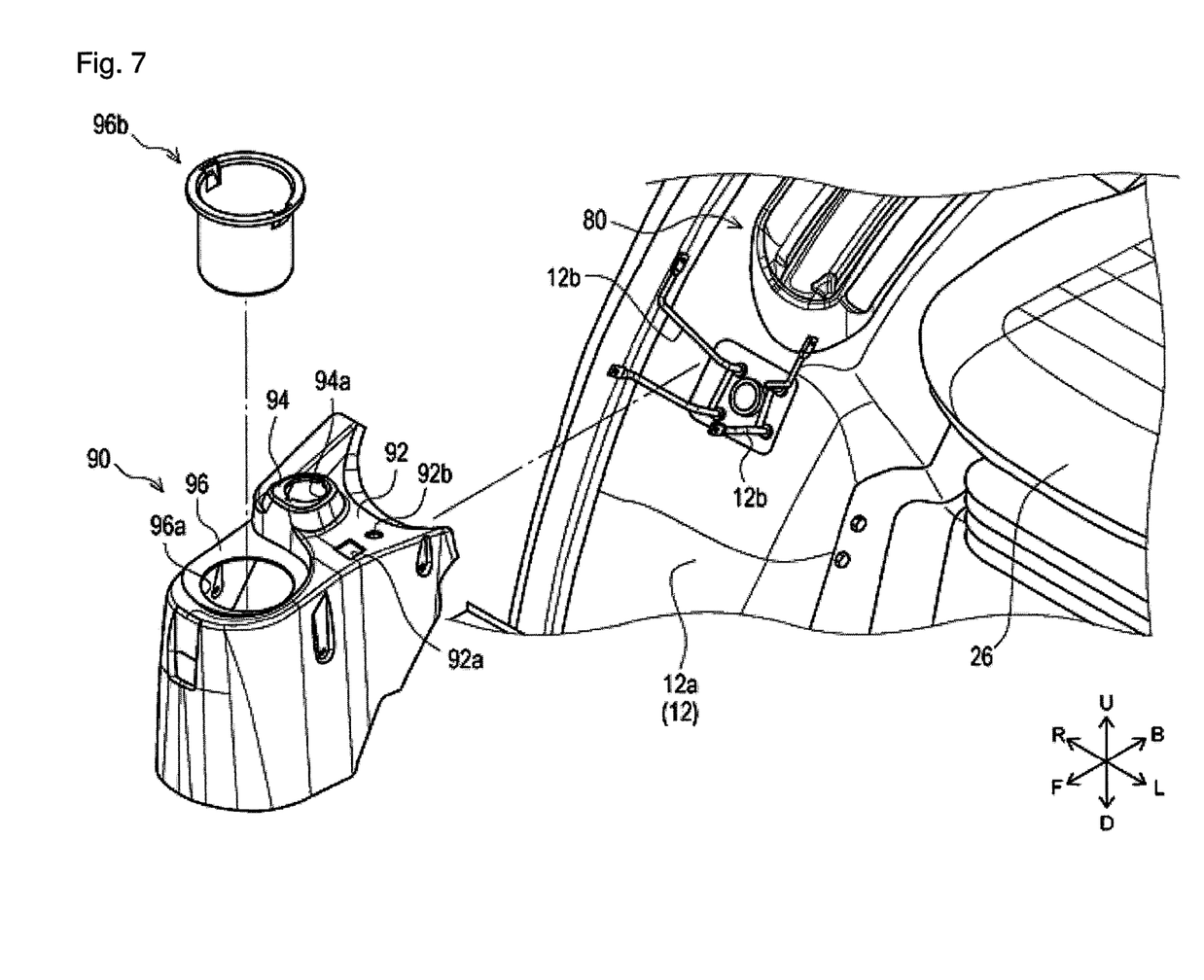
FIG. 7 is an exploded perspective view of a second cover member.

The second cover member 90 formed as described above is fixated to a left/right pair of brackets 12b provided to the inner lateral surface 12a of the fender 12 (immediately forward of the first cover member 80) (see FIG. 7). Consequently, the first cover member 80 and the second cover member 90 are arranged so as to be aligned in the front/back direction. In this state, a rear end portion of the second cover member 90 (the first flat portion 92) is arranged so as to be continuous with a front end portion of the first cover member 80 (front bottom end portion of the curved surface portion 84). This creates a sense of unity between the first cover member 80 and the second cover member 90.

The PTO clutch switch 62 is fitted into and fixed to the opening 94a of the projected portion 94. The PTO clutch switch 62 is formed in a substantially round columnar shape (dial-shape). The PTO clutch switch 62 is configured so as to be depressible and rotatable. Rotating the PTO clutch switch 62 to a prescribed position while depressing the PTO clutch switch 62 downward connects the PTO clutch, and transmission of power to the PTO shaft 20 can be enabled. Moreover, by depressing the PTO clutch switch 62 again, the PTO clutch is disconnected and transmission of power to the PTO shaft 20 can be disabled.

The rotating light switch 64 is fitted into and fixed to the first opening 92a of the first flat portion 92. The rotating light switch 64 is configured so as to be depressible. The rotating light 22b can be switched on/off each time the rotating light switch 64 is depressed.

The loader switch 66 is fitted into and fixed to the second opening 92b of the first flat portion 92. The loader switch 66 is configured so as to be depressible. The loader operation regulation mechanism can be enabled/disabled each time the loader switch 66 is depressed.

The loader lever 72 is inserted into the opening 96a of the second flat portion 96. The opening 96a is covered by a cover 72a while in a state where the loader lever 72 is inserted. A grip portion 72b which the operator grips when operating the loader lever 72 is provided on an upper end portion of the loader lever 72. An upper portion of the loader lever 72 is appropriately curved and is formed so that the grip portion 72b is positioned where it is easy for the operator sitting in the driver's seat 26 to operate the grip portion 72b. The loader lever 72 is supported around a support point provided on a lower portion thereof so as to be rockable in the front/back direction and a left-right direction.

In addition, a regulation lever 72c is provided in the through hole 98 so as to project forward. By sliding the regulation lever 72c rearward, operation of the loader lever 72 can be regulated (the rocking operation can be disabled). Moreover, by sliding the regulation lever 72c forward, regulation of the operation of the loader lever 72 can be canceled.

In the operation part C having a configuration as described above, the first arrangement part C1, the second arrangement part C2, the third arrangement part C3, and the fourth arrangement part C4 are arranged so as to be aligned in the front/back direction. Further, each of the operation tools arranged in the operation part C operates the work apparatus mounted to the tractor 1. An arrangement where the operation tools which operate the work apparatus are collectively arranged in the operation part C makes it easier for the operator to memorize the arrangement of the operation tools, and thus enhances operability of the operation tools.

A positional relationship of each operation tool arranged in the operation part C having the configuration as described above is explained below.

As described above, the first arrangement part C1 is arranged on the right side of the backrest portion 26a of the driver's seat 26, that is, slightly rearward of the operator sitting in the driver's seat 26. The first auxiliary control lever 42, the second auxiliary control lever 44, and the third auxiliary control lever 46 arranged in the first arrangement part C1 are operation tools having a relatively low frequency of use. Accordingly, by arranging the first auxiliary control lever 42, the second auxiliary control lever 44, and the third auxiliary control lever 46 rearward of the operator, other operation tools can be preferentially arranged in positions where it is easy for the operator sitting in the driver's seat 26 to operate the operation tools (positions forward of the operator).

Meanwhile, the second arrangement part C2, the third arrangement part C3, and the fourth arrangement part C4 are arranged forward of the seat surface portion 26b of the driver's seat 26, that is, forward of the operator sitting in the driver's seat 26. Operation tools arranged in the second arrangement part C2, the third arrangement part C3, and the fourth arrangement part C4 are operation tools having a relatively high frequency of use. By arranging operation tools having a high frequency of use forward of the operator as described above, operability can be enhanced effectively.

In addition, whereas operation tools arranged in the second arrangement part C2 and the fourth arrangement part C4 (the PTO speed change lever 52 and the hydraulic lifting lever 54, and the loader lever 72) are rockable in the front/back direction, operation tools arranged in the third arrangement part C3 (the PTO clutch switch 62, the rotating light switch 64, and the loader switch 66) are depressible. An arrangement where operation tools having different operation methods are arranged alternately in the front/back direction makes it easier for the operator to memorize the arrangement of the operation tools, and thus enhances operability (prevention of operational errors).

Further, by arranging depressible operation tools (the third arrangement part C3) between rockable operation tools (the second arrangement part C2 and the fourth arrangement part C4), a certain interval can be ensured between the rockable operation tools, which prevents operational errors of the rockable operation tools. In addition, an arrangement where depressible operation tools are arranged between rockable operation tools arranged at a certain interval as described above eliminates wasted space, and thus enables efficient arrangement of operation tools.

Figure 6:
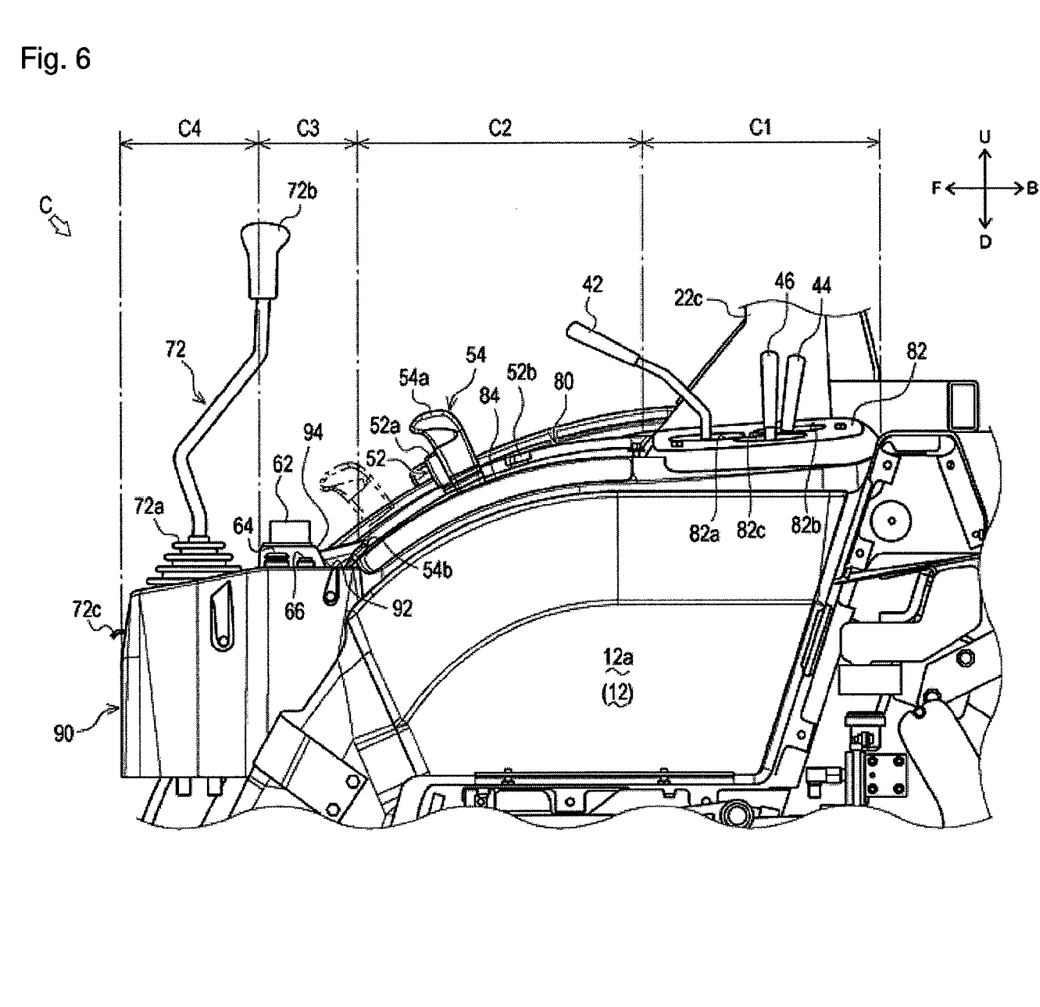
FIG. 6 is a side view of the operation part.

In addition, as illustrated in FIG. 6, grip portions of the operation tools arranged in the second arrangement part C2

(the grip portion 52a and the grip portion 54a) are arranged at positions higher than the operation tools arranged in the third arrangement part C3 (the PTO clutch switch 62 and the like). Compared to a case where the operation tools of the third arrangement part C3 are arranged at a position higher than the grip portions of the operation tools of the second arrangement part C2, a configuration as described above can prevent an operation inconsistent with an intention of the operator (erroneous operation) caused by the operation tools arranged in the third arrangement part C3 contacting the operator's hand or the like. In particular, since the operation tools arranged in the third arrangement part C3 are operated by a simple depressing operation, it is easy for an erroneous operation to occur; therefore, prevention of such an erroneous operation is highly necessary.

In addition, the grip portion of the operation tool arranged in the fourth arrangement part C4 (the grip portion 72b) is arranged at a position higher than the grip portions of the operation tools arranged in the second arrangement part C2 and the operation tools arranged in the third arrangement part C3. By arranging the grip portion of the operation tool arranged in the fourth arrangement part C4 (which is farthest from the operator) at a high position, the operator is able to instantaneously recognize and readily grip the grip portion. That is, the operator can easily operate the operation tool arranged in the fourth arrangement part C4 (farthest from the operator) which is normally the hardest to operate.

In addition, since the operation tools of the third arrangement part C3 are arranged at a position lower than the grip portions of the operation tools of the second arrangement part C2 and the fourth arrangement part C4, erroneous operation of the operation tools of the third arrangement part C3 can be more effectively prevented. That is, even in a case where the operator alternately operates the operation tools of the second arrangement part C2 and the operation tool of the fourth arrangement part C4, the operator's hand will be less likely to interfere with the operation tools of the third arrangement part C3.

In addition, in a case where the operation tools of the second arrangement part C2 are rocked to a front end portion (see the two-dot dashed line in FIG. 6), the grip portions of the operation tools of the second arrangement part C2 (the grip portion 52a and the grip portion 54a) are lowered to a height near that of the operation tools of the third arrangement part C3. As a result, when the operation tool of the third arrangement part C3 is operated in this state (a state where the operation tools of the second arrangement part C2 are in close proximity to the operation tool of the third arrangement part C3), the operation tools of the second arrangement part C2 do not get in the way of the operation tool of the third arrangement part C3 and operability of the operation tool of the third arrangement part C3 does not deteriorate.

It is noted that the front loader 30 according to the present embodiment is provided to the tractor 1 so as to be detachable. In addition, when the front loader 30 is removed from the tractor 1, the loader lever 72 also becomes unnecessary; therefore, the loader lever 72 is also removed from the tractor 1. In the present embodiment, when the loader lever 72 is removed from the tractor 1, a cup holder 96b is inserted in the opening 96a of the second cover member 90 (see FIG. 7). The cup holder 96b is formed in a substantially cylindrical shape having a bottom portion (bottom surface). The operator can store a cup filled with a beverage and small items in the cup holder 96b inserted in the second cover member 90.

As described in the foregoing description, the tractor 1 (work vehicle) according to the present embodiment is provided with a first operation tool (the PTO speed change lever 52 and the hydraulic lifting lever 54) which is rockable in the front/back direction arranged on the right side of the driver's seat 26, a second operation tool (the loader lever 72) which is rockable in the front/back direction arranged forward of the first operation tool, and a third operation tool (the PTO clutch switch 62) which is depressible arranged between the first operation tool and the second operation tool (in the front/back direction).

By arranging a depressible operation tool (the third operation tool) between rockable operation tools (the first operation tool and the second operation tool), operation tools having different operation methods can be arranged alternately, thereby enhancing operability (prevention of operational errors).

In addition, the first operation tool, the second operation tool, and the third operation tool are operation tools which operate the work apparatus (the front loader 30, and the tilling apparatus and the like to be coupled with the PTO shaft 20).

By a configuration as described above, operation tools which operate the work apparatus can be collectively arranged, and thus operability can be enhanced.

In addition, the third operation tool includes a PTO clutch operation tool (the PTO clutch switch 62) which disengages/engages the power transmitted to the PTO shaft 20 transferring the power to the exterior.

By a configuration as described above, the operability of the PTO clutch operation tool can be enhanced.

In addition, the second operation tool includes a front loader operation tool (the loader lever 72) which is rockable in the front/back direction and the right/left direction and operates the front loader 30.

By a configuration as described above, the operability of the front loader operation tool can be enhanced.

In addition, the first operation tool includes a PTO speed change operation tool (the PTO speed change lever 52) which changes the speed of the power transmitted to the PTO shaft 20.

By a configuration as described above, the operability of the PTO speed change operation tool can be enhanced.

In particular, when the third operation tool includes the PTO clutch operation tool, operation tools related to the PTO shaft 20 can be collectively arranged, and operability can be further enhanced.

In addition, the first operation tool is provided with a first grip portion (the grip portion 52a and the grip portion 54a) arranged at a position higher than the third operation tool and which is gripped upon operation, and the second operation tool is provided with a second grip portion (the grip portion 72b) arranged at a position higher than the first operation tool and the third operation tool and which is gripped upon operation.

By a configuration as described above, the operability of each operation tool can be further enhanced.

It is noted that the PTO speed change lever 52 and the hydraulic lifting lever 54 according to the present embodiment are examples of an embodiment of the first operation tool according to the present invention.

The loader lever 72 according to the present embodiment is an example of an embodiment of the second operation tool according to the present invention.

The PTO clutch switch 62 according to the present embodiment is an example of an embodiment of the third operation tool according to the present invention.

The tilling apparatus and the like to be coupled with the PTO shaft 20 according to the present embodiment and the front loader 30 according to the present embodiment are examples of an embodiment of the work apparatus according to the present invention.

The PTO clutch switch 62 according to the present embodiment is an example of an embodiment of the PTO clutch operation tool according to the present invention.

The loader lever 72 according to the present embodiment is an example of an embodiment of the front loader operation tool according to the present invention.

The PTO speed change lever 52 according to the present embodiment is an example of an embodiment of the PTO speed change operation tool according to the present invention.

The grip portion 52a and the grip portion 54a according to the present embodiment are examples of an embodiment of the first grip portion according to the present invention.

The grip portion 72b according to the present embodiment is an example of an embodiment of the second grip portion according to the present invention.

It is noted that in the present embodiment, the tractor 1 is shown as an example of the work vehicle according to the present invention; however, the present invention is not limited thereto. That is, the work vehicle can be other agricultural vehicles, construction vehicles, and industrial vehicles.

In the present embodiment, the operation part C is arranged on the right side of the driver's seat 26; however, the present invention is not limited thereto and the operation part C can be arranged on a left side of the driver's seat 26.

In the present embodiment, the PTO speed change lever 52 and the hydraulic lifting lever 54 are shown as examples of the first operation tool according to the present invention; however, the present invention is not limited thereto and other operation tools which are rockable in the front/back direction can be the first operation tool.

In the present embodiment, the loader lever 72 is shown as an example of the second operation tool according to the present invention; however, the present invention is not limited thereto and other operation tools which are rockable in the front/back direction can be the second operation tool.

In the present embodiment, the PTO clutch switch 62 is shown as an example of the third operation tool according to the present invention; however, the present invention is not limited thereto and other operation tools which are depressible can be the third operation tool.

In the present embodiment, the PTO clutch switch 62, which can be depressed and rotated, is shown as an example of the third operation tool according to the present invention; however, an operation tool which can only be rotated, for example, (an operation tool to adjust a preset value of a regulation of the tractor 1 or the like, for example), can be the third operation tool.

In the present embodiment, the front loader 30 and the tilling apparatus and the like to be coupled with the PTO shaft 20 are shown as examples of the work apparatus according to the present invention; however, the present invention is not limited thereto and various other work apparatuses can be used.

In the present embodiment, the tractor 1 having the cabin 22 is shown as an example of the work vehicle; however, the present invention is not limited thereto and the work vehicle can be the tractor 1 not having the cabin 22.

An arrangement of a hose 28a which is connected to the air conditioner 28 is explained below. For ease of explanation, one of the rear wheels 10 arranged on the right side is omitted in FIGS. 8 and 9.

The hose 28a, which exchanges refrigerants with a compressor (not shown in the drawings) arranged in the hood 16, is connected to the air conditioner 28 (see FIG. 1). The hose 28a is led out from within the hood 16 and arranged so as to pass under the cabin 22. Further, the hose 28a is arranged from the front end portion of the fender 12 to near a rear end portion thereof so as to go along an outer lateral surface 12c (lateral surface opposite the rear wheel 10) of the fender 12 on the right side. Further, the hose 28a is connected to the air conditioner 28 in the ceiling of the cabin 22 by passing through an interior of the rear support column 22c provided on the right side of the cabin 22.

Figure 8:
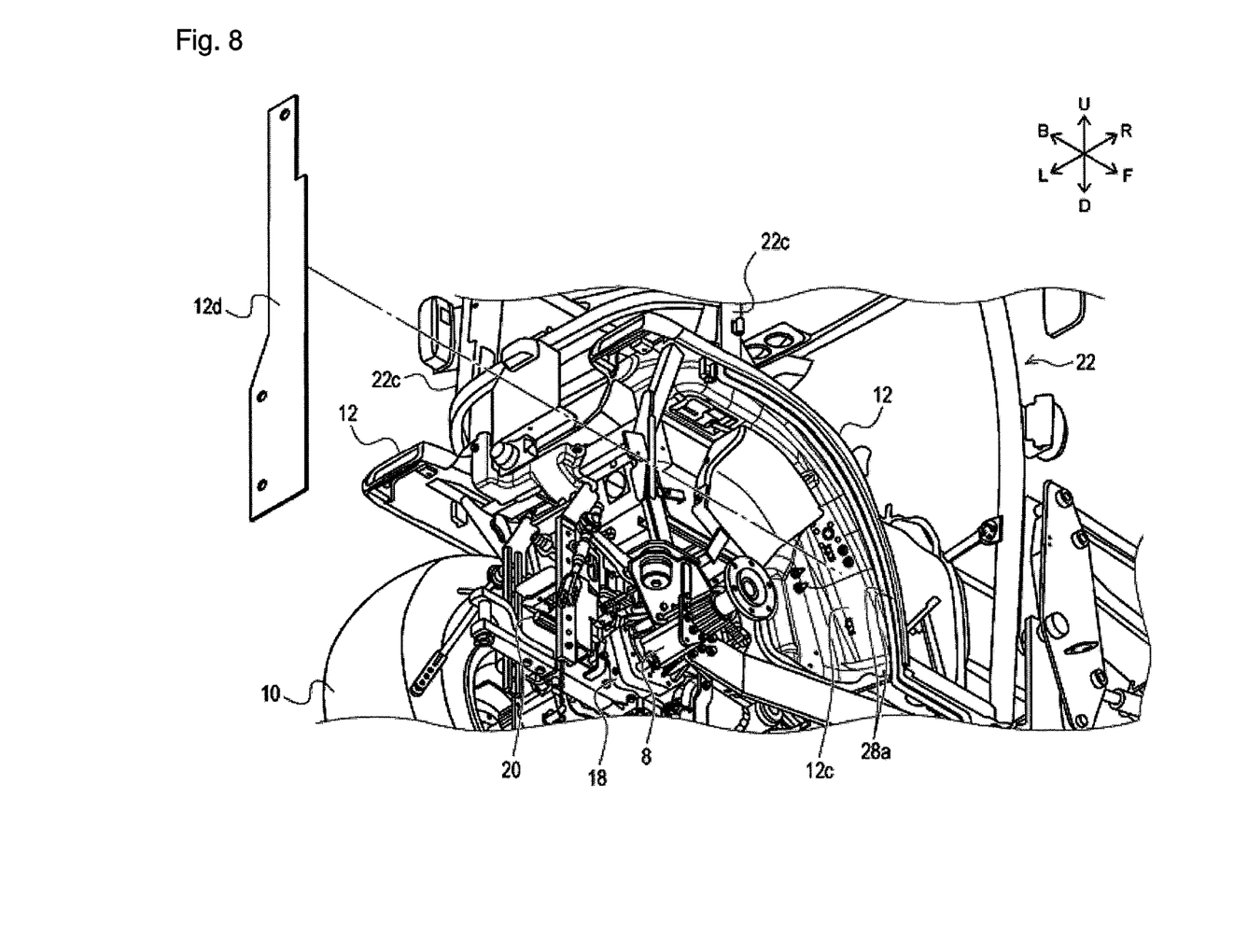
FIG. 8 is an exploded perspective view of a hose cover.
Figure 9:
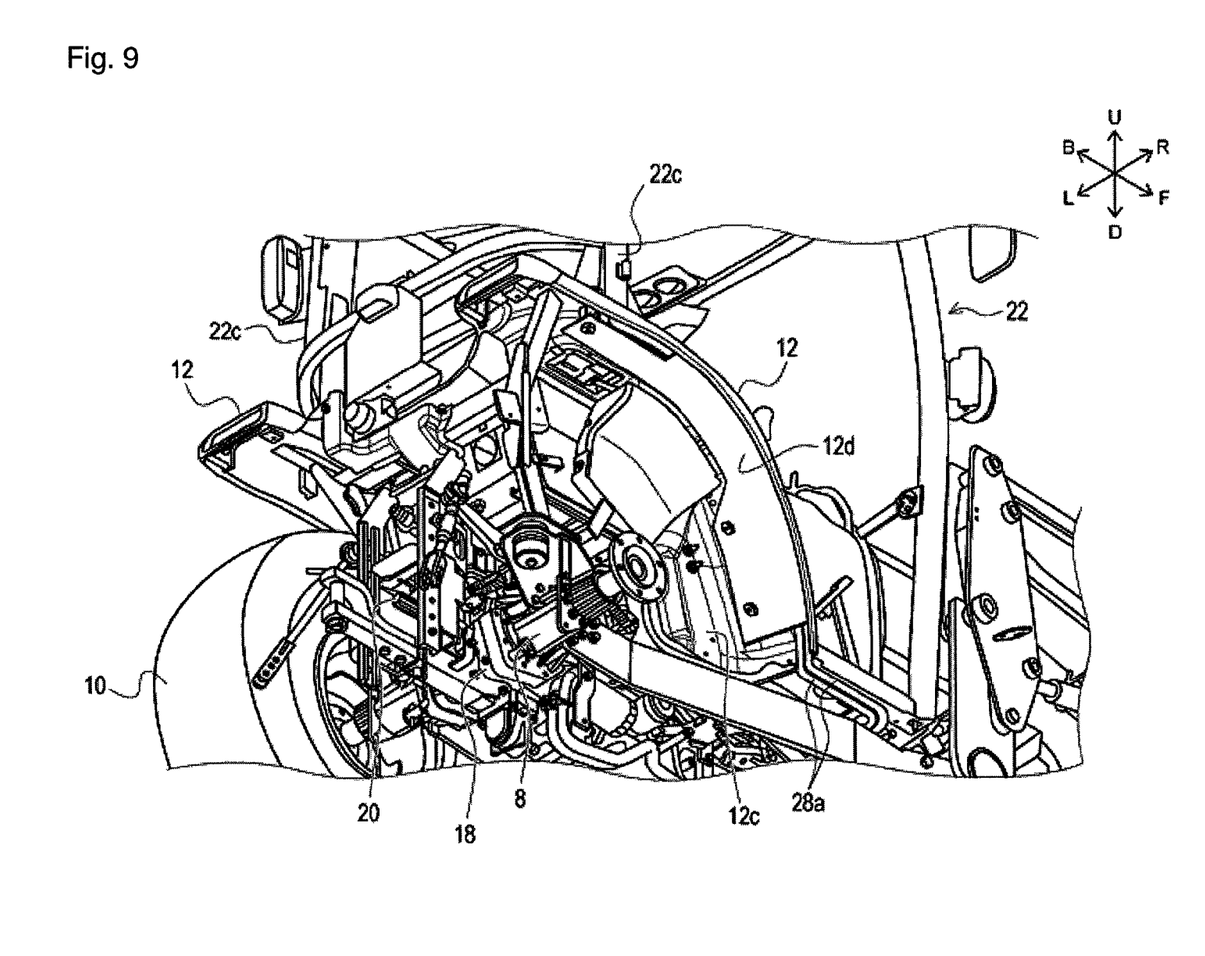
FIG. 9 is a perspective view of the hose cover in a fixated state.

When the hose 28a is arranged on an outer side of the fender 12 as described above (so as to go along the outer lateral surface 12c), there is a possibility that the hose 28a will be damaged by interference with the rear wheels 10 and mud and rocks and the like thrown up by rotation of the rear wheels 10. In this regard, in the present embodiment, a hose cover 12d is provided along the outer lateral surface 12c of the fender 12, as illustrated in FIGS. 8 and 9.

The hose cover 12d is a thin metallic flat plate which is formed into a substantially rectangular shape. The hose cover 12d is formed so as to have a thickness which allows for the hose cover 12d to be elastically deformed by applying some external force thereto. The hose cover 12d is formed by cutting out certain portions thereof so as to avoid interference with other members.

When the hose cover 12d as described above is attached to the fender 12, the hose cover 12d is made to curve (elastically deform) so as to match a shape of the fender 12. In this state, the hose cover 12d is fixed to the fender 12 using a fastening tool such as a nut. As described above, the hose cover 12d is made to curve so as to go along with the shape of the fender 12 upon attaching the hose cover 12d to the fender 12. In other words, there is no need to form the hose cover 12d into a curved shape to match the shape of the fender 12 in advance, and thus manufacturing costs can be reduced.

In addition, in this case, the hose 28a is passed through a space between the hose cover 12d and the fender 12. This allows for the hose 28a to be held by the hose cover 12d so as to go along the fender 12, thereby eliminating a need to separately prepare a member to hold the hose 28a. Thus, manufacturing costs can be reduced.

In addition, since the hose 28a is lead to the rear support column 22c by passing through the outer side of the fender 12 (an outer side of the cabin 22), it is possible to reduce the noise within the living space 22a compared to a case where the hose 28a is passed through an inner side of the cabin 22. That is, in the case where the hose 28a is passed through the interior of the cabin 22, it is necessary to form a through hole (opening) in the cabin 22 to pass the hose 28a through. However, when the through hole is formed in the cabin 22, external noise is conveyed to inside the living space 22a, thereby increasing noise within the living space 22a. However, arranging the hose 28a on the outer side of the cabin 22 as in the present embodiment eliminates a need to form the through hole in the cabin 22 to pass the hose 28a through and noise can be reduced. Further, since there is no need to form the through hole, it is also possible to prevent water from infiltrating the living space 22a.

In addition, since the hose 28a is arranged on the outer side of the cabin 22, a space inside the cabin 22 (the living space 22a) can be larger, which enhances the level of freedom with which each operation tool can be arranged. Further, in the case where the hose 28a is arranged inside the cabin 22, a cover to cover the hose 28a becomes necessary.

Since the cover must be formed using material (for example, resin and the like) that matches the feel of the living space 22a, manufacturing costs such as mold costs increase. In this regard, by arranging the hose 28a on the outer side of the cabin 22 and covering the hose 28a with the hose cover 12d formed by a simple flat plate as in the present embodiment, manufacturing costs can be reduced.

It is noted that there is no particular limitation on a method of fixing (attaching) the hose cover 12d to the fender 12. That is, the hose cover 12d should be fixated in a state where a space to arrange the hose 28a is ensured between the hose cover 12d and the fender 12.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle, comprising:
a driver's seat;
a first operation tool which is rockable in a front/back direction and arranged on one of a left side and a right side of the driver's seat;
a second operation tool which is rockable in the front/back direction and arranged forward of the first operation tool; and
a third operation tool which is depressible and arranged between the first operation tool and the second operation tool in the front/back direction,
wherein the third operation tool is located below an upper end of both the first operation tool and the second operation tool, and
wherein the third operation tool is located forward of the first operation tool even when the first operation tool is in a forward position.

2. The work vehicle according to claim 1, wherein the first operation tool, the second operation tool, and the third operation tool operate at least one work apparatus.

3. The work vehicle according to claim 1, wherein the third operation tool is a PTO clutch operation tool which disengages/engages power transmitted to a PTO shaft.

4. The work vehicle according to claim 1, wherein the second operation tool is a front loader operation tool which is rockable in both the front/back direction and a right/left direction, and operates a front loader.

5. The work vehicle according to claim 1, wherein:
the first operation tool comprises a user grippable first grip arranged at a position higher than the third operation tool; and
the second operation tool comprises a user grippable second grip arranged at a position higher than the first operation tool and the third operation tool.

6. The work vehicle according to claim 1, wherein the work vehicle is a tractor.

7. The work vehicle according to claim 1, wherein the first operation tool is located more rearward than a front end of the driver's seat and the second operation tool is located more forward than the front end of the driver's seat.

8. The work vehicle according to claim 7, wherein the upper end of the first operation tool is located below the upper end of the second operation tool.

9. A work vehicle, comprising:
a driver's seat;
a first operation tool which is rockable in a front/back direction and arranged on one of a left side and a right side of the driver's seat;
a second operation tool which is rockable in the front/back direction and arranged forward of the first operation tool; and
a third operation tool which is depressible and arranged between the first operation tool and the second operation tool in the front/back direction,
wherein the third operation tool is located below an upper end of both the first operation tool and the second operation tool, and
wherein the first operation tool is a PTO speed change operation tool adapted to change a speed of a PTO shaft.

10. A work vehicle, comprising:
a driver's seat;
a first operation tool which is rockable or movable in a front/back direction and arranged on one of a left side and a right side of the driver's seat;
a second operation tool which is rockable or movable in the front/back direction and arranged on one of the left side and the right side of the driver's seat; and
a third operation tool which is depressible and arranged on one of the left side and the right side of the driver's seat;
wherein:
the first operation tool comprises a first grip arranged at a position higher than the third operation tool; and
the second operation tool comprises a second grip arranged at a position higher than the first operation tool and the third operation tool, and
wherein an upper end the third operation tool is located below an upper end of both the first operation tool and the second operation tool, and
wherein the third operation tool is located forward of the first operation tool even when the first operation tool is in a forward position.

11. The work vehicle according to claim 10, wherein the first operation tool, the second operation tool, and the third operation tool operate at least one work apparatus.

12. The work vehicle according to claim 10, wherein the third operation tool is a PTO clutch operation tool which disengages/engages power transmitted to a PTO shaft.

13. The work vehicle according to claim 10, wherein the second operation tool is a front loader operation tool which is rockable in the front/back direction and the right/left direction and operates a front loader.

14. The work vehicle according to claim 10, wherein the work vehicle is a tractor.

15. A work vehicle, comprising:
a driver's seat;

a first operation tool which is rockable or movable in a front/back direction and arranged on one of a left side and a right side of the driver's seat;
a second operation tool which is rockable or movable in the front/back direction and arranged on one of the left side and the right side of the driver's seat; and
a third operation tool which is depressible and arranged on one of the left side and the right side of the driver's seat;
wherein:
the first operation tool comprises a first grip arranged at a position higher than the third operation tool; and
the second operation tool comprises a second grip arranged at a position higher than the first operation tool and the third operation tool,
wherein an upper end the third operation tool is located below an upper end of both the first operation tool and the second operation tool, and
wherein the first operation tool is a PTO speed change operation tool which changes a speed and/or power transmitted to a PTO shaft.

16. A work vehicle, comprising:
a driver's seat;
a PTO operation tool which is rockable or movable in a front/back direction and arranged on one of a left side and a right side of the driver's seat;
a front loader operation tool which operates a front loader and is rockable or movable in the front/back direction and a left/right direction arranged forward of the PTO operation tool; and
a depressible PTO clutch operation tool arranged, relative to the front/back direction, between the PTO operation tool and the front loader operation tool and which is adapted to disengage/engage power transmitted to a PTO shaft,
wherein the depressible PTO clutch operation tool is located below an upper end of both the PTO operation tool and the front loader operation tool.

17. The work vehicle according to claim 16, wherein:
the PTO operation tool comprises a first grip arranged at a position higher than the PTO clutch operation tool; and
the front loader operation tool comprises a second grip arranged at a position higher than the PTO operation tool and the PTO clutch operation tool.

18. The work vehicle according to claim 16, wherein:
the PTO operation tool comprises a user grippable grip arranged at a position higher than a user grippable portion of the PTO clutch operation tool; and
the front loader operation tool comprises a user grippable grip arranged at a position higher than the grippable grip of the PTO operation tool and the grippable portion of the PTO clutch operation tool.

19. The work vehicle according to claim 16, wherein the work vehicle is a tractor.

20. A work vehicle, comprising:
a driver's seat;
a first operation tool which is rockable or movable in a front/back direction and arranged on one of a left side and a right side of the driver's seat;
a second operation tool which is rockable or movable in the front/back direction and arranged on one of the left side and the right side of the driver's seat; and
a third operation tool which is depressible and arranged on one of the left side and the right side of the driver's seat;
wherein:
the first operation tool comprises a first grip arranged at a position higher than the third operation tool; and
the second operation tool comprises a second grip arranged at a position higher than the first operation tool and the third operation tool,
wherein an upper end the third operation tool is located below an upper end of both the first operation tool and the second operation tool, and
wherein the upper end of the second operation tool is located above the upper end of the first operation tool and wherein the second and third operation tools are located more forward than a front end of the driver's seat.

* * * * *

UNITED STATES PATENT AND TRADEMARK OFFICE
CERTIFICATE OF CORRECTION

PATENT NO. : 10,000,120 B2
APPLICATION NO. : 14/641757
DATED : June 19, 2018
INVENTOR(S) : Daisuke Kobayashi et al.

Page 1 of 1

It is certified that error appears in the above-identified patent and that said Letters Patent is hereby corrected as shown below:

On the Title Page

Abstract, 1st sentence, please change "on a one side" to --on one side--.

In the Claims

Column 14, Line 48 (Claim 10, Line 18), please change "an upper end the third" to --an upper end of the third--.

Column 15, Line 16 (Claim 15, Line 18), please change "an upper end the third" to --an upper end of the third--.

Column 16, Line 33 (Claim 20, Line 18), please change "an upper end the third" to --an upper end of the third--.

Signed and Sealed this
Ninth Day of April, 2019

Andrei Iancu
*Director of the United States Patent and Trademark Office*